US012725058B2

(12) United States Patent
Arumugam et al.

(10) Patent No.: US 12,725,058 B2
(45) Date of Patent: Sep. 1, 2026

(54) DEPLOYMENT OF MACHINE LEARNING MODELS USING LARGE LANGUAGE MODELS AND FEW-SHOT LEARNING

(71) Applicant: SAP SE, Walldorf (DE)

(72) Inventors: Rajesh Vellore Arumugam, Singapore (SG); Anantharaman Ravi, Singapore (SG); Isaac New Yi Qing, Singapore (SG); Sundeep Gullapudi, Singapore (SG); Yi Quan Zhou, Singapore (SG)

(73) Assignee: SAP SE, Walldorf (DE)

( * ) Notice: Subject to any disclaimer, the term of this patent is extended or adjusted under 35 U.S.C. 154(b) by 563 days.

(21) Appl. No.: 18/358,245

(22) Filed: Jul. 25, 2023

(65) Prior Publication Data

US 2025/0036974 A1 Jan. 30, 2025

(51) Int. Cl.
*G06N 20/20* (2019.01)
*G06N 5/04* (2023.01)

(52) U.S. Cl.
CPC ............... *G06N 5/04* (2013.01); *G06N 20/20* (2019.01)

(58) Field of Classification Search
CPC ........... G06N 20/20; G06N 20/00; G06N 5/04
See application file for complete search history.

(56) References Cited

U.S. PATENT DOCUMENTS 12,124,468 B1 * 10/2024 Zhou ........................ G06F 9/547
2023/0186147 A1 * 6/2023 Sen ........................ G06N 20/00 706/12
2023/0326191 A1 * 10/2023 Li .......................... G06N 20/20 382/155
2024/0095447 A1 * 3/2024 Ping ........................ G10L 13/02
2024/0185001 A1 * 6/2024 Nagaraju .............. G06F 40/284
2024/0282298 A1 * 8/2024 Koneru ................. G10L 15/183
2024/0330279 A1 * 10/2024 Truong ............... G06F 16/2428
2024/0354319 A1 * 10/2024 Dinu ........................ G06F 40/35
2024/0411666 A1 * 12/2024 Chan ................... G06F 11/3624
2024/0419912 A1 * 12/2024 Somech ................. G06N 3/044

* cited by examiner

*Primary Examiner* — Mohammad A Siddiqi
(74) *Attorney, Agent, or Firm* — Fish & Richardson P.C.

(57) ABSTRACT

Methods, systems, and computer-readable storage media for providing, for a set of ML models, a set of training metrics determined using test data during a training phase, providing, for a production-use ML model, a set of inference metrics based on predictions generated by the production-use ML model, generating, by a prompt generator, a set of few-shot examples using the set of training metrics and the set of inference metrics, inputting, by the prompt generator, the set of few-shot examples to a LLM as prompts, transmitting, to the LLM a query, displaying, to a user, a recommendation that is received from the LLM and responsive to the query, receiving input from a user indicating a user-selected ML model responsive to the recommendation, and deploying a user-selected ML model to an inference runtime for production use.

20 Claims, 6 Drawing Sheets

| Bank Statement ID | Company Code | Amount | Currency | Partner Name | Note |
|---|---|---|---|---|---|
| 1000 | CC1 | 990 | EUR | ACME | 1000789 |
| 2000 | CC2 | 2000 | USD | | 90011 876, 895 REF Soylent |
| ... | ... | ... | ... | ... | ... |

| Document # | Company Code | Amount | Currency | Organization |
|---|---|---|---|---|
| 10000789 | CC1 | 1000 | EUR | ACME |
| 90011876 | CC2 | 1200 | USD | Soylent |
| 90011898 | CC2 | 800 | USD | Soylent |
| 10000790 | CC1 | 1100 | EUR | ACME |
| ... | ... | ... | ... | ... |

DEPLOYMENT OF MACHINE LEARNING MODELS USING LARGE LANGUAGE MODELS AND FEW-SHOT LEARNING

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

SUMMARY

Implementations of the present disclosure are directed to a machine learning (ML) system for matching a query entity to one or more target entities. More particularly, implementations of the present disclosure are directed to a ML model deployment platform for selecting ML models to be deployed for production use in inference, the ML model deployment platform using LLMs and few-shot learning for selection and deployment of ML models.

In some implementations, actions include providing, for a set of ML models, a set of training metrics determined using test data during a training phase of ML models in the set of ML models, providing, for a production-use ML model, a set of inference metrics based on predictions generated by the production-use ML model, generating, by a prompt generator, a set of few-shot examples using the set of training metrics and the set of inference metrics, inputting, by the prompt generator, the set of few-shot examples to a LLM as prompts, the set of few-shot examples providing context to the LLM for queries associated with ML model selection, transmitting, to the LLM a query, displaying, to a user, a recommendation that is received from the LLM and responsive to the query, receiving input from a user indicating a user-selected ML model responsive to the recommendation, and deploying a user-selected ML model to an inference runtime for production use. Other implementations of this aspect include corresponding systems, apparatus, and computer programs, configured to perform the actions of the methods, encoded on computer storage devices.

These and other implementations can each optionally include one or more of the following features: deploying a user-selected ML model to an inference runtime for production use at least partially includes transmitting the user-selected ML model from a ML model store to the inference runtime; the set of training metrics includes, for each ML model in the set of ML models, a sub-set of training metrics including a model identifier, a code, a proposal rate, an accuracy, and a threshold; the set of inference metrics includes sub-sets of inference metrics each including an auto-task accuracy, a proposal rate, and a confidence threshold; the auto-task accuracy indicates an accuracy of automatic execution of a task in response to a prediction of the production-use ML model; the query includes a code and at least one target metric; and generating, by the prompt generator, the set of few-shot examples comprises populating a prompt template.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
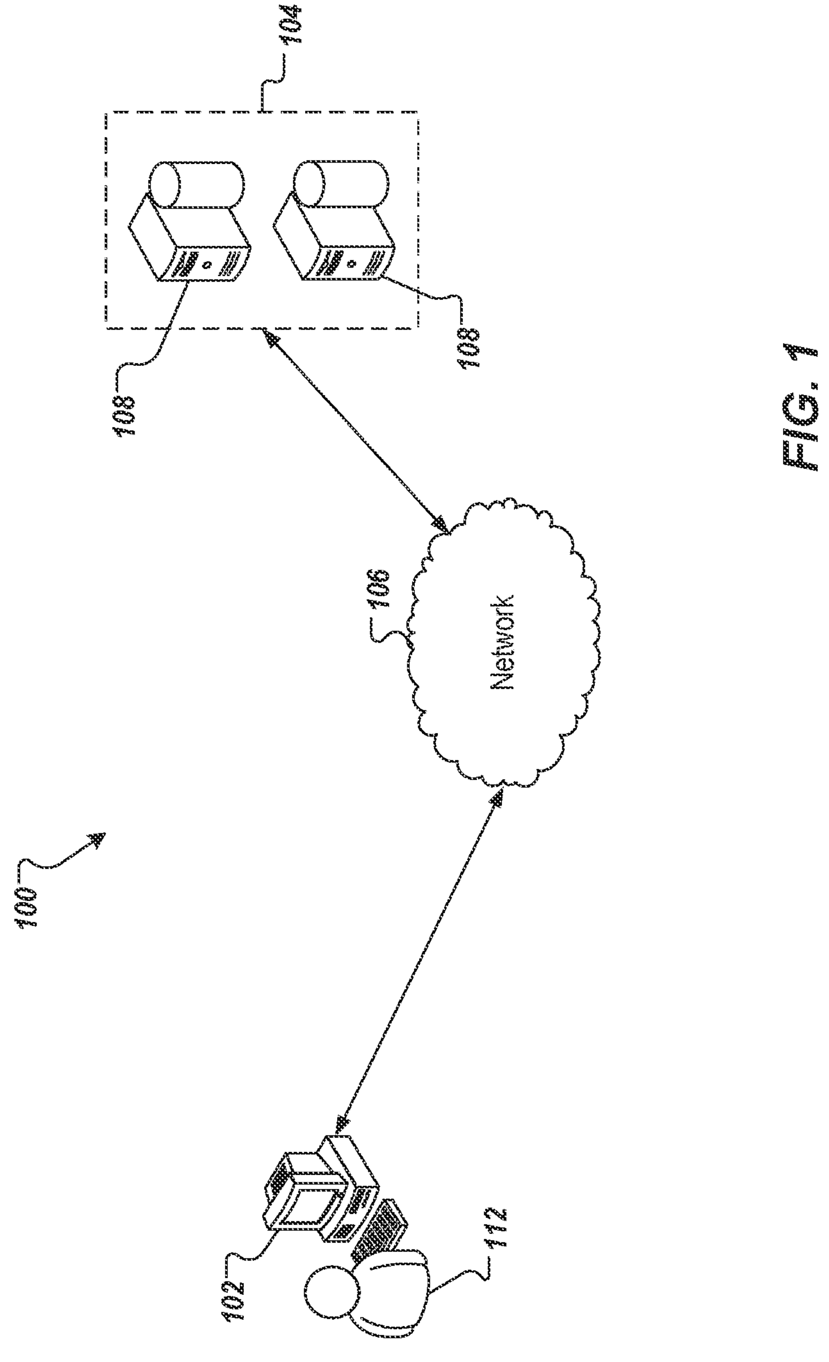
FIG. 1 depicts an example architecture that can be used to execute implementations of the present disclosure.

Implementations of the present disclosure are directed to a machine learning (ML) system for matching a query entity to one or more target entities. More particularly, implementations of the present disclosure are directed to a ML model deployment platform for selecting ML models to be deployed for production use in inference, the ML model deployment platform using LLMs and few-shot learning for selection and deployment of ML models.

Implementations can include actions of providing, for a set of ML models, a set of training metrics determined using test data during a training phase of ML models in the set of ML models, providing, for a production-use ML model, a set of inference metrics based on predictions generated by the production-use ML model, generating, by a prompt generator, a set of few-shot examples using the set of training metrics and the set of inference metrics, inputting, by the prompt generator, the set of few-shot examples to a LLM as prompts, the set of few-shot examples providing context to the LLM for queries associated with ML model selection, transmitting, to the LLM a query, displaying, to a user, a recommendation that is received from the LLM and responsive to the query, receiving input from a user indicating a user-selected ML model responsive to the recommendation, and deploying a user-selected ML model to an inference runtime for production use.

To provide context for implementations of the present disclosure, enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using ML systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

The problem of matching entities represented by computer-readable records (electronic documents) appears in many contexts. Example contexts can include matching product catalogs, deduplicating a materials database, and matching incoming payments from a bank statement table to open invoices. Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Technologies related to artificial intelligence (AI) and ML, AI and ML being used interchangeably herein, have been widely applied in various fields. For example, ML-based decision systems can be used to make decisions on subsequent tasks. With reference to the example context, an ML-based decision system can be used to determine matches between bank statements and invoices. For example, invoices can be cleared in an accounting system by matching invoices to one or more line items in bank statements. In other contexts, decisions on treatment courses of patients (e.g., prescribe/not prescribe a drug) and/or decisions on whether to approve customers for loans can be made based on output of ML-based decision systems. In general, an output of a ML-based decision system can be referred to as a prediction or an inference result.

However, the use of ML model in decision systems present unique challenges that did not previously exist in the pre-ML world. One challenge is that, to get the best automation rates it is imperative that the ML model is periodically trained as patterns might change over a period of time. These periodically trained ML models are evaluated or compared based on a set of metrics. These can include, but are not limited to, the accuracy of the ML model, the number of predictions that the ML model can make for a given set of items, and a level of confidence for which an automated action can be executed in response to the prediction (e.g., automatically clear invoices).

One of the main problems that must be addressed is how a user equipped with these metrics can select and configure a ML model for deployment in production to achieve the best results (e.g., high automation rates, least number of false predictions) for a given configuration (e.g., confidence threshold). While this selection and configuration process by itself is difficult, the complexity increases as the ML model behaves differently for each subset of data. For example, the ML model might be matching bank statements from different company codes against invoices with different accuracies for the same confidence threshold configuration setting.

In view of the above context, implementations of the present disclosure provide a ML model deployment platform for selecting ML models to be deployed for production use in inference. More particularly, and as described in further detail herein, implementations of the present disclosure provide a ML model deployment platform that uses LLMs and few-shot learning for selection and deployment of ML models. In some implementations, metrics are extracted for an entity matching ML model during training and the corrections/feedback during inference are utilized as samples for few-shot learning of the LLM.

Implementations of the present disclosure are described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP AI Core) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a ML-based decision system that predicts matches between entities (e.g., CashApp, referenced by way of example herein). In some examples, the ML-based decision system can include or interact with a ML model deployment platform for selecting ML models to be deployed (e.g., to the ML-based decision system) for production use in inference. Also, in accordance with implementations of the present disclosure, the server system 104 can host one or more LLMs that the ML model deployment platform interacts with to support selection of ML models for deployment.

Figure 2:
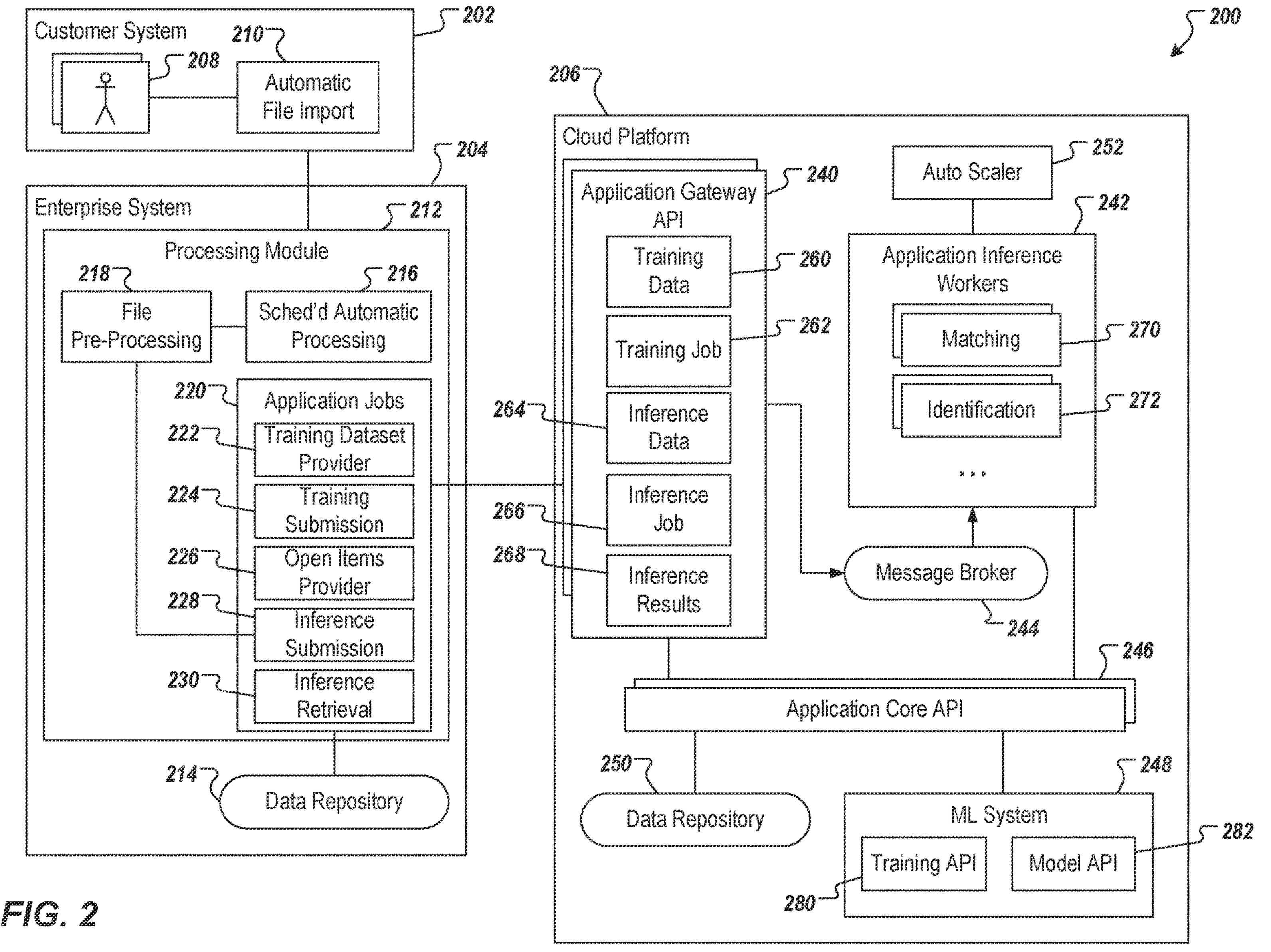
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP AI Core. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

Figure 3:
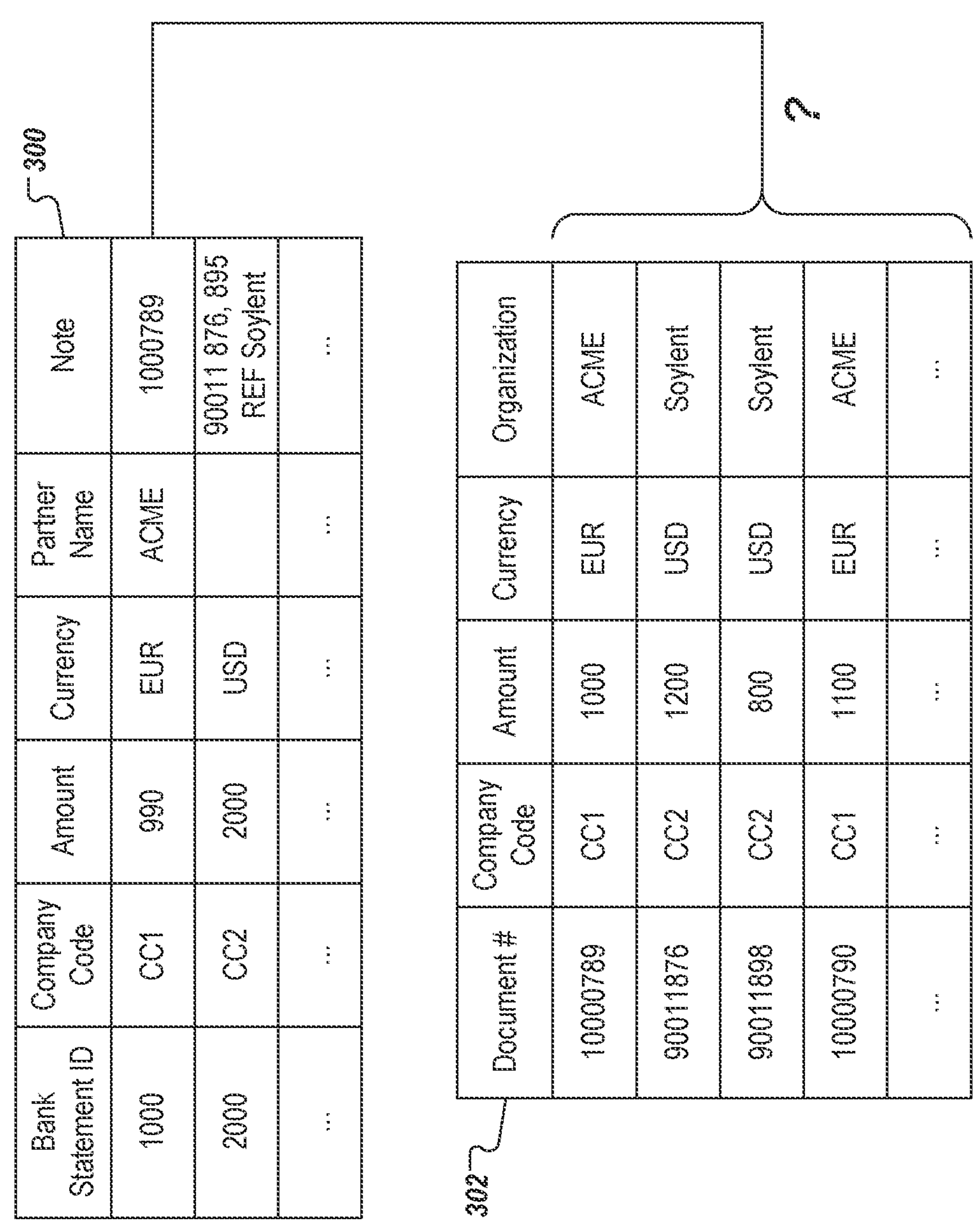
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes an invoice table that includes invoice records respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity) and one or more invoice records (entity/-ies) (e.g., using CashApp, as described above).

To achieve this, a ML model (matching model) is provided as a classifier that is trained to predict entity pairs to a fixed set of class labels ($\vec{l}$) (e.g., $l_0$, $l_1$, $l_2$). For example, the set of class labels ($\vec{l}$) can include 'no match' ($l_0$), 'single match' ($l_1$), and 'multi match' ($l_2$). In some examples, the ML model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p}=\{p_0, p_1, p_2\}$. In some examples, $p_0$ is a prediction probability (also referred to herein as confidence c) of the item pair $\vec{a}$, $\vec{b}$ belonging to a first class (e.g., no match), $p_1$ is a prediction probability of the item pair $\vec{a}$, $\vec{b}$ belonging to a second class (e.g., single match), and $p_2$ is a prediction probability of the item pair $\vec{a}$, $\vec{b}$ belonging to a third class (e.g., multi match).

Here, $p_0$, $p_1$, and $p_2$ can be provided as numerical values indicating a likelihood (confidence) that the item pair $\vec{a}$, $\vec{b}$ belongs to a respective class. In some examples, the ML model can assign a class to the item pair $\vec{a}$, $\vec{b}$ based on the values of $p_0$, $p_1$, and $p_2$. In some examples, the ML model can assign the class corresponding to the highest value of $p_0$, $p_1$, and $p_2$. For example, for an entity pair $\vec{a}$, $\vec{b}$, the ML model can provide that $p_0=0.13$, $p_1=0.98$, and $p_2=0.07$. Consequently, the ML model can assign the class 'single match' ($l_1$) to the item pair à, $\vec{b}$.

Figure 4:
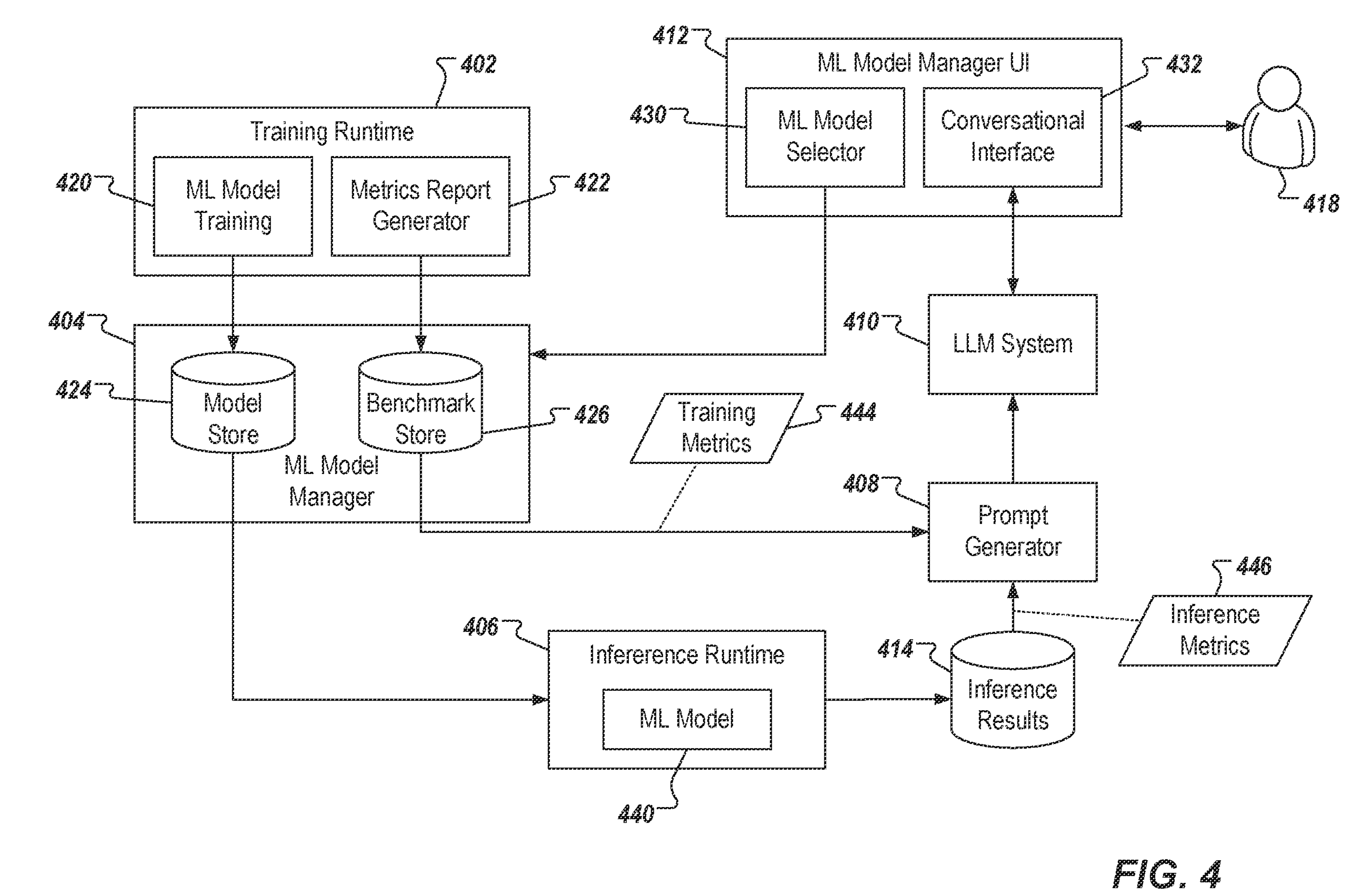
FIG. 4 depicts an example conceptual architecture in accordance with implementations of the present disclosure.

As introduced above, implementations of the present disclosure use LLMs to extract conversational-style explanations for entity matches output from ML models. FIG. 4 depicts an example conceptual architecture 400 in accordance with implementations of the present disclosure. In the example of FIG. 4, the conceptual architecture 400 can be representative of at least a portion of a ML model deployment platform and includes a training runtime 402, a ML model manager 404, an inference runtime 406, a prompt generator 408, a LLM system 410, a ML model manager UI 412, and an inference results store 414.

As described in further detail herein, a user 418 can interact with the ML model manager UI 412 for selection and deployment of ML models for production use in inference. More particularly, the LLM system 410 generates recommendations to the user 418 as to a ML model that can be selected for deployment for inference. In some examples, the LLM system 410 executes any appropriate LLM. Example LLM's can include, without limitation, ChatGPT, Microsoft Chatbot, Bard, end the like. For example, prompts and any other appropriate information, can be provided to the LLM system 410 through, for example, an application programming interface (API) that is exposed by the LLM system 410.

In the example of FIG. 4, the training runtime includes a ML model training module 420 and a metrics report generator 422. The ML model manager 404 includes a ML model store 424 and a benchmark store 426. The ML model manager UI includes a ML model selector 430 and a conversational interface 432. The inference runtime 406 executes a ML model 440. For example, and as described in further detail herein, the training runtime 402 trains a set of ML models that are stored in the ML model store 424. A ML model, such as the ML model 440, is selected for deployment to the inference runtime 406 for production use in inference (e.g., predicting entity matches).

In accordance with implementations of the present disclosure, the metrics report generator 422 provides a metrics report for each ML model that is trained by the ML model training module 420. In general, each ML model can be iteratively trained using training data where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

In some implementations, the metrics report including a set of training metrics 444. In some examples, the metrics report is generated by processing test data through the ML model. In some examples, the training metrics include, but are not limited to, a proposal rate, an accuracy, an auto-clear rate, and the like. In some examples, each metric is evaluated for a given confidence threshold setting and for a subset of data based on one or more parameters (e.g., company codes, country key).

In further detail, given predictions from the ML model (e.g., line-item matching ML model) for a list of queries (e.g., bank statements) and corresponding targets (e.g., invoices) the metrics report generator 422 computes the proposal rate, accuracy, and automation rate based on a queries subset (e.g., for a given company code). As noted above, the list of queries and targets are provided as test data that is processed by the ML model during training (e.g., during a testing phase of training). This is computed for both match types of single matches and mutli-matches at each threshold level from 0 to 100% at equal intervals (e.g., 10% intervals). For the example use case, these training metrics are computed as follows:

Proposal Rate=Total number of query entities (e.g., bank statements) predicted in a match by the ML model/Total number of query entities (e.g., bank statements) sent to the ML model Accuracy=Number of query entities (e.g., bank statements) correctly predicted/Total number of query entities (e.g., bank statements) predicted in a match by the ML model Automation rate=Proposal Rate×Accuracy Table 1 below depicts example training metrics for the example use case:

TABLE 1

Example Training Metrics

| Model ID | Company Code | Proposal Rate | Accuracy | Threshold |
|---|---|---|---|---|
| 100 | C100 | 95 | 98% | 97% |
| 100 | C200 | 96 | 99% | 98% |
| 200 | C100 | 96 | 99% | 98% |

In some implementations, a set of inference metrics 446 is collected during production use of a given ML model (e.g., the ML model 440) based on the inference results stored in the inference results store 414. The inference metrics can include an auto-clear threshold, a number of correct predictions, a number of correct auto-clears, and a number of incorrect predictions (e.g., corrected manually by a user). The inference metrics output from the ML model 440 currently in use are continuously collected. This data might have both correct and incorrect predictions. Any corrections made by the user for the wrong predictions are also collected along with the correct predictions. These data serve as few-shot samples for few-shot learning for the LLM, discussed in further detail herein. The LLM learns from this data the behavior of the ML model in terms of accuracies and the configured threshold. This learning helps the ML model in benchmarking newly trained or past models with the current ML model in use (e.g., the ML model 440). Table 2 below depicts example inference metrics for the example use case:

TABLE 2

Example Inference Metrics

| Auto-clear Accuracy | Proposal Rate | Confidence Threshold |
|---|---|---|
| 95 | 95 | 98% |
| 97 | 96 | 99% |

In accordance with implementations of the present disclosure, the set of training metrics 444 and the set of inference metrics 446 are used by the prompt generator 408 to generate a prompt that is input to the LLM a few-shot learning examples. This conditions the LLM to learn different and complex relationships of the metrics with respect to a given configuration (e.g., confidence threshold) and data subset (e.g., company code). In some examples, a prompt template (e.g., in JSON or .csv format) is used to provide a list of benchmarks in mapping models to the benchmarks. This provides the context and the data for the LLM to respond to queries related to model selection. For example, the LLM can use metrics (e.g., accuracy, proposal rate, etc.) specified in a populated prompt template to determine the best model (from the list of models) for a given metric. Following is an example of the model benchmark prompt template:

"The following is a list of models identified by ModelID and their corresponding benchmarks.
ModelID:
[training benchmark for 123]
[inference metrics for 123]
ModelID: [456]
[training benchmark for 456]
[inference metrics for 456]
ModelID: [789]
[training benchmark for 789]
[inference metrics for 789]
[User query]"

In this example, the brackets [ ] represents a place holder where the model identifier (ModelID) and corresponding benchmark in the prompt template is filled. 'User query' refers to the query typed by the user that is appended to the populated prompt template.

In further detail, in natural language processing (NLP), few-shot learning (also referred to as in-context learning and/or few-shot prompting) is a prompting technique that enables a LLM to process examples before attempting a task. In the context of the present disclosure, the task includes providing recommendations for a best-fit ML model for a given data subset (e.g., company code) and/or configuration (e.g., auto-clear threshold, proposal threshold). Few-shot learning is distinct from fine-tuning of a LLM, which is pre-trained, on a task-specific dataset. More particularly, during few-shot learning, no parameters of the LLM are changed. Instead, the few-shot examples input to the LLM prime the LLM to provide context for subsequent queries submitted to the LLM.

The conversational interface 432 is provided to enable the user 418 to query the LLM of the LLM system 410, which returns recommendations for the best-fit ML model to be deployed in view of a given data subset (e.g., company code) and/or configuration (e.g., auto-clear threshold, proposal threshold). In this manner, the user 418 can select the best-fit ML model for deployment (e.g., from the ML model store 424 to the inference runtime 406). Further, the user 418 is informed from the LLM as to why the particular LLM was recommended. Example queries to the LLM system 410 can include:

Which model would be the best in terms of maximum number of auto-clear for the company code C001? Explain why?

Which model would be the best for highest accuracy for the threshold of 0.95 for company code C001?

Which model has the highest automation rate for company code C002? Explain how it is superior in relation to the current model in use?

The following are non-limiting examples of queries to the LLM system 410 and responses provided from the LLM system 410:

Query: Which model is the best for an accuracy of 98%?

Response: Based on the given benchmarks, the model for training job (glim25) has the best accuracy of 98% with correctly proposed of 774, incorrectly proposed of 17, and not proposed of 228.

Query: Which model can be used for overall best result?

Response: The model with the overall best result would be the one with the highest accuracy and the highest rate of correctly proposed instances. In this case, it would be the model for training job (glim30) with an accuracy of 99.1 and correctly proposed instances of 695.

In these examples, glim25 and glim30 refer to the model identifiers of the corresponding models.

In some implementations, the conversational interface 432 to the LLM equips the user 418 with the ability to select from a list of trained ML models based on the metrics. The LLM conditioned on the benchmarks, configuration and the current ML model performance not only provides a recommendation, but also provides intuitive explanations on why that recommendation was made.

Figure 5:
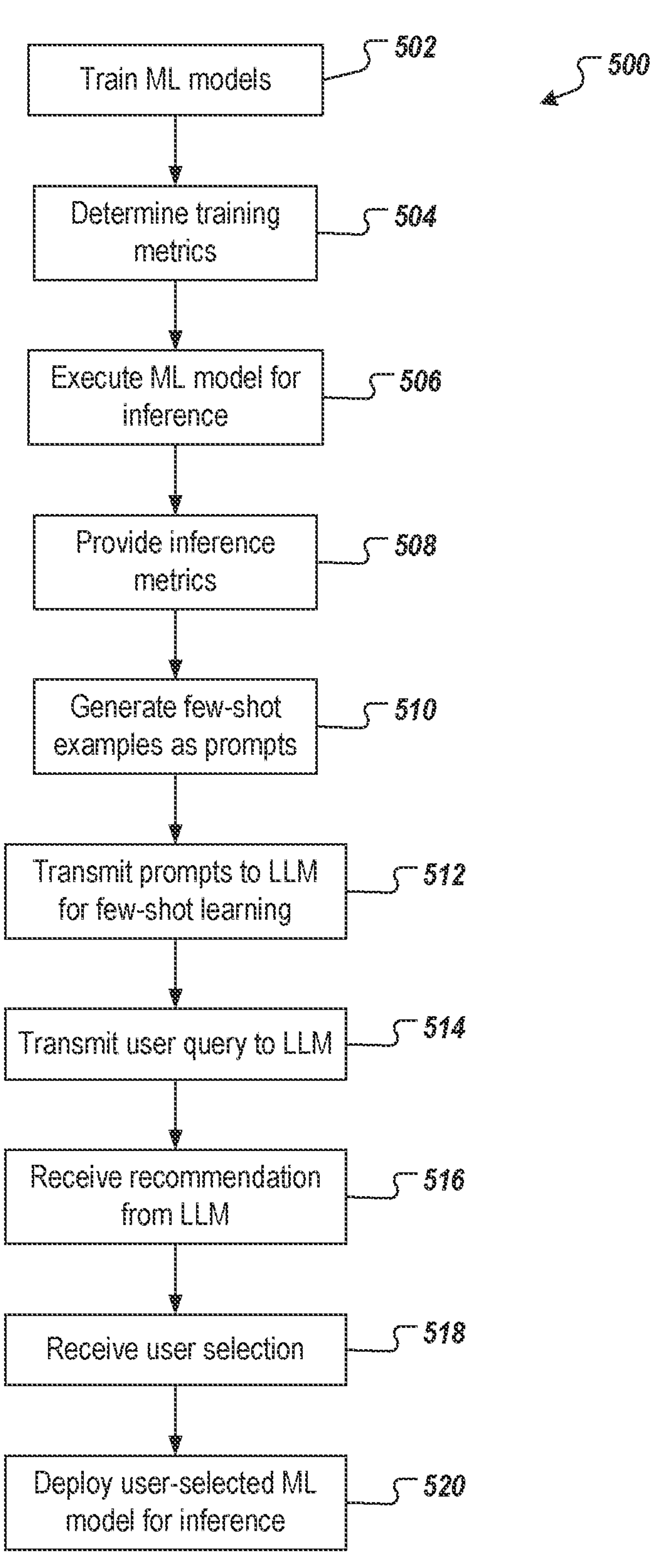
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

ML models are trained (502). For example, and as described in detail herein, ML model training module 420 of the training runtime 432 trains one or more ML models. In some examples, the ML models are entity matching ML models (e.g., line-item matching ML models). After training, each ML model is stored in the ML model store 424 of the ML model manager 404. Training metrics are determined (504). For example, and as described in detail herein, after training, test data is processed through the ML model and the metrics report generator 422 generates training metrics that are stored in the benchmark store 426. The training metrics are provided to the prompt generator 408.

An ML model is executed for inference (506). For example, and as described in detail herein, the ML model 440 is executed for inference by the inference runtime 406 and inference results are stored in the inference results store. Inference metrics are provided (508). For example, and as described in detail herein, inference metrics are provided to the prompt generator 408.

Few-shot examples are generated as prompts (510). For example, and as described in detail herein, the prompt generator 408 generates few-shot learning examples based on the training metrics and the inference metrics. The prompts are transmitted to the LLM for few-shot learning (512). For example, and as described in detail herein, the prompt generator 408 transmits the prompts (few-shot learning examples) to the LLM system 410 for processing by the LLM.

A user query is transmitted to the LLM (514). For example, and as described in detail herein, the user 418 uses the conversational interface to query the LLM of the LLM system 410. A recommendation is received from the LLM (516). For example, and as described in detail herein, the LLM outputs a recommendation that is responsive to the query and is based on the context provided by the few-shot examples. A user selection is received (518). For example, and as described in detail herein, the user 418 provides input to the ML model selector 430 to select a ML model based on the recommendation provided from the LLM system 410. The ML model selected by the user is deployed for inference (520). For example, and as described in detail herein, the ML model selected by the user is deployed from the ML model store 424 for execution by the inference runtime 406.

Implementations of the present disclosure provide one or more technical advantages. One example advantage is that implementations of the present disclosure leverage LLMs through the use of few-shot examples (prompts) to reduce the complexity of the ML model selection process for deployment in production usage. The LLM, primed with the few-shot examples provided based on the training metrics and inference metrics, can provide ML model recommendations and intuitive explanations for the user to make informed ML model selection. Use of the LLM helps to bring the human analytical perspective into the ML model selection process.

The following non-limiting, illustrative example of the example use case can be considered. For a training job A, a country code FR might have 10 bank statements during its validation process and the ML model might have predicted all of them correctly. In this case the accuracy for country code FR would be 100%. Another training job B with same country code FR can be considered, which contains 1000 bank statements during its validation process and the ML model might have predicted 900 correctly. In this case, the accuracy for country code FR would be 90%. For ML model selection FR, even though training job A has the highest accuracy from the user perspective it is wise to select training job B as it has a greater number of validation items. This is one of the scenarios, for which ML model selection is not straight-forward and a human user would face difficulty in making an informed decision. There would be many such similar scenarios where the complexity of a human user selection process can be simplified using the LLM's few-shot learning.

Figure 6:
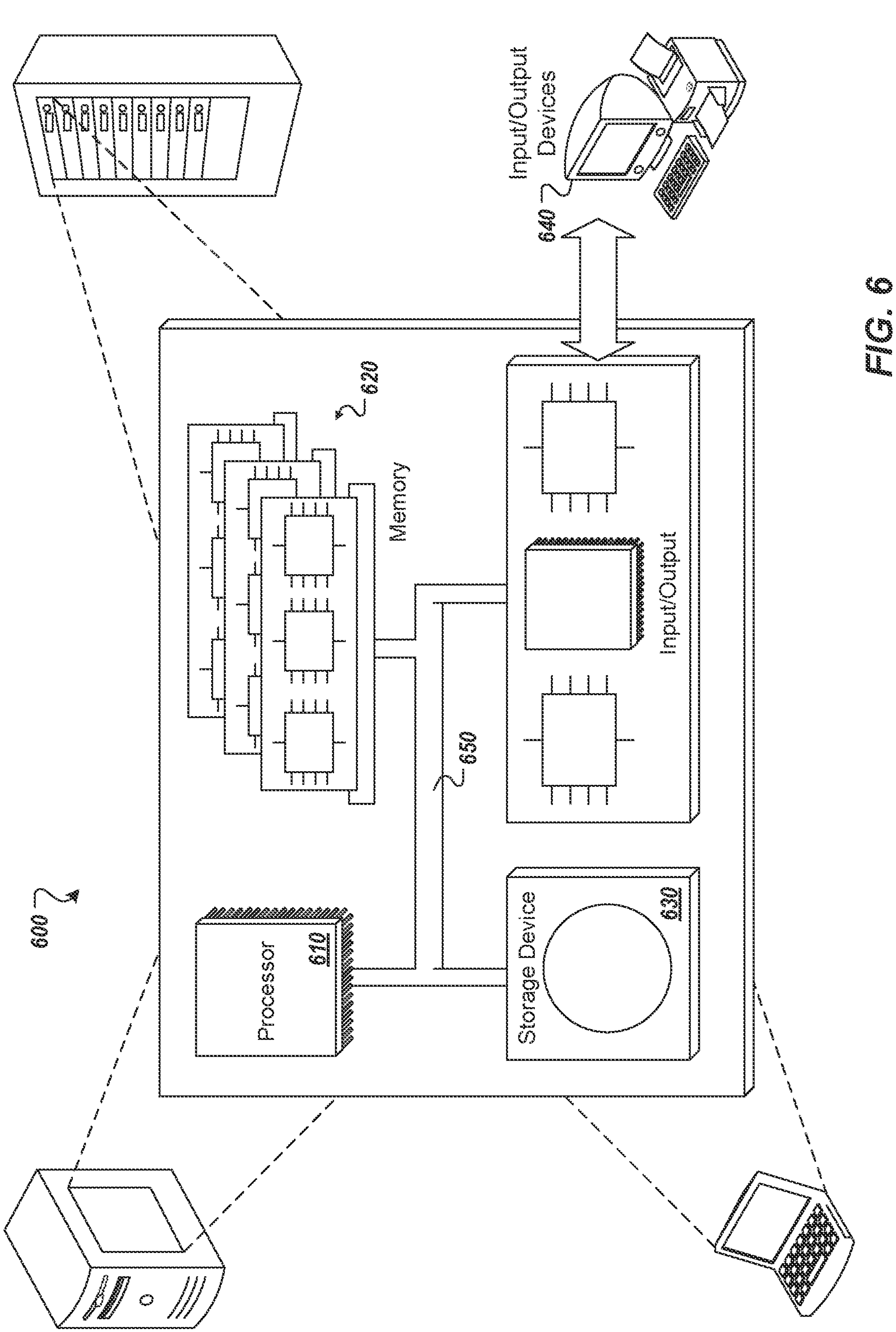
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for deploying machine learning (ML) models for inference in production, the method being executed by one or more processors and comprising:

providing, for a set of ML models, a set of training metrics determined using test data during a training phase of ML models in the set of ML models;

providing, for a production-use ML model, a set of inference metrics based on predictions generated by the production-use ML model;

generating, by a prompt generator, a set of few-shot examples using the set of training metrics and the set of inference metrics, the set of few-shot examples comprising two or more model identifiers, each model identifier identifying a ML model, and, for each model identifier, a sub-set of training metrics of the set of training metrics and a sub-set of inference metrics of the set of inference metrics;

inputting, by the prompt generator, the set of few-shot examples to a large language model (LLM) as prompts, the set of few-shot examples providing context to the LLM for queries associated with ML model selection;

transmitting, to the LLM a query;

displaying, to a user, a recommendation that is received from the LLM and responsive to the query;

receiving input from a user indicating a user-selected ML model responsive to the recommendation; and deploying a user-selected ML model to an inference runtime for production use.

2. The method of claim 1, wherein deploying a user-selected ML model to an inference runtime for production use at least partially comprises transmitting the user-selected ML model from a ML model store to the inference runtime.

3. The method of claim 1, wherein the set of training metrics comprises, for each ML model in the set of ML models, a sub-set of training metrics comprising the model identifier, a code, a proposal rate, an accuracy, and a threshold.

4. The method of claim 1, wherein the set of inference metrics comprises sub-sets of inference metrics each comprising an auto-task accuracy, a proposal rate, and a confidence threshold.

5. The method of claim 4, wherein the auto-task accuracy indicates an accuracy of automatic execution of a task in response to a prediction of the production-use ML model.

6. The method of claim 1, wherein the query comprises a code and at least one target metric.

7. The method of claim 1, wherein generating, by the prompt generator, the set of few-shot examples comprises populating a prompt template.

8. A non-transitory computer-readable storage medium coupled to one or more processors and having instructions stored thereon which, when executed by the one or more processors, cause the one or more processors to perform operations for deploying machine learning (ML) models for inference in production, the operations comprising:

providing, for a set of ML models, a set of training metrics determined using test data during a training phase of ML models in the set of ML models;

providing, for a production-use ML model, a set of inference metrics based on predictions generated by the production-use ML model;

generating, by a prompt generator, a set of few-shot examples using the set of training metrics and the set of inference metrics, the set of few-shot examples comprising two or more model identifiers, each model identifier identifying a ML model, and, for each model identifier, a sub-set of training metrics of the set of training metrics and a sub-set of inference metrics of the set of inference metrics;

inputting, by the prompt generator, the set of few-shot examples to a large language model (LLM) as prompts, the set of few-shot examples providing context to the LLM for queries associated with ML model selection;

transmitting, to the LLM a query;

displaying, to a user, a recommendation that is received from the LLM and responsive to the query;

receiving input from a user indicating a user-selected ML model responsive to the recommendation; and deploying a user-selected ML model to an inference runtime for production use.

9. The non-transitory computer-readable storage medium of claim 8, wherein deploying a user-selected ML model to an inference runtime for production use at least partially comprises transmitting the user-selected ML model from a ML model store to the inference runtime.

10. The non-transitory computer-readable storage medium of claim 8, wherein the set of training metrics comprises, for each ML model in the set of ML models, a sub-set of training metrics comprising the model identifier, a code, a proposal rate, an accuracy, and a threshold.

11. The non-transitory computer-readable storage medium of claim 8, wherein the set of inference metrics comprises sub-sets of inference metrics each comprising an auto-task accuracy, a proposal rate, and a confidence threshold.

12. The non-transitory computer-readable storage medium of claim 11, wherein the auto-task accuracy indicates an accuracy of automatic execution of a task in response to a prediction of the production-use ML model.

13. The non-transitory computer-readable storage medium of claim 8, wherein the query comprises a code and at least one target metric.

14. The non-transitory computer-readable storage medium of claim 8, wherein generating, by the prompt generator, the set of few-shot examples comprises populating a prompt template.

15. A system, comprising:

a computing device; and a computer-readable storage device coupled to the computing device and having instructions stored thereon which, when executed by the computing device, cause the computing device to perform operations for deploying machine learning (ML) models for inference in production, the operations comprising:

providing, for a set of ML models, a set of training metrics determined using test data during a training phase of ML models in the set of ML models;

providing, for a production-use ML model, a set of inference metrics based on predictions generated by the production-use ML model;

generating, by a prompt generator, a set of few-shot examples using the set of training metrics and the set of inference metrics, the set of few-shot examples comprising two or more model identifiers, each model identifier identifying a ML model, and, for each model identifier, a sub-set of training metrics of the set of training metrics and a sub-set of inference metrics of the set of inference metrics;

inputting, by the prompt generator, the set of few-shot examples to a large language model (LLM) as prompts, the set of few-shot examples providing context to the LLM for queries associated with ML model selection;

transmitting, to the LLM a query;

displaying, to a user, a recommendation that is received from the LLM and responsive to the query;

receiving input from a user indicating a user-selected ML model responsive to the recommendation; and deploying a user-selected ML model to an inference runtime for production use.

16. The system of claim 15, wherein deploying a user-selected ML model to an inference runtime for production use at least partially comprises transmitting the user-selected ML model from a ML model store to the inference runtime.

17. The system of claim 15, wherein the set of training metrics comprises, for each ML model in the set of ML models, a sub-set of training metrics comprising the model identifier, a code, a proposal rate, an accuracy, and a threshold.

18. The system of claim 15, wherein the set of inference metrics comprises sub-sets of inference metrics each comprising an auto-task accuracy, a proposal rate, and a confidence threshold.

19. The system of claim 18, wherein the auto-task accuracy indicates an accuracy of automatic execution of a task in response to a prediction of the production-use ML model.

20. The system of claim 15, wherein the query comprises a code and at least one target metric.

* * * * *